(12) United States Patent
Talamini, Sr.

(10) Patent No.: US 6,343,761 B1
(45) Date of Patent: *Feb. 5, 2002

(54) DEVICE FOR SEPARATING PORTIONS OF SPOOLED OPTICAL FIBERS

(75) Inventor: Victor J. Talamini, Sr., Asbury, NJ (US)

(73) Assignee: TyCom (US) Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,827

(22) Filed: May 25, 1999

(51) Int. Cl.⁷ ............................. B65H 75/38; G02B 6/00
(52) U.S. Cl. ........................ 242/388; 385/135; 385/134
(58) Field of Search .............................. 242/388, 388.6, 242/398, 400.1, 405.1, 395, 591, 129, 166, 171, 222, 399; 385/134, 135, 136, 137, 123

(56) References Cited

U.S. PATENT DOCUMENTS

| 1,600,482 A | 9/1926 | Nuhring ................. 242/399 X |
| 2,601,960 A | 7/1952 | Hick ....................... 242/129.6 |
| 3,014,336 A | 12/1961 | Henry |
| 3,371,885 A | 3/1968 | Douglas ..................... 242/129 |
| 3,491,967 A | 1/1970 | Sawyer et al. .............. 242/129 |
| 4,330,005 A | 5/1982 | Kjarsgaard ............. 137/355.28 |
| 4,340,193 A | 7/1982 | Zitzman ................ 242/129.72 |
| 4,384,688 A | 5/1983 | Smith |
| 4,664,260 A | 5/1987 | Stokes ........................ 206/386 |
| 4,715,549 A | 12/1987 | Travlos |
| 4,741,492 A | 5/1988 | Reysen ........................ 242/129 |
| 4,765,560 A | 8/1988 | Branback .................... 242/129 |
| 4,768,732 A | 9/1988 | Greenleaf |
| 4,786,213 A | 11/1988 | Leppanen .................... 405/303 |
| 4,796,939 A | 1/1989 | Symonds et al. .......... 294/67.1 |
| 4,826,100 A | 5/1989 | Belliveau .................... 242/129 |
| 4,844,376 A | 7/1989 | Maraman, Sr. ............. 242/129 |
| 4,846,343 A * | 7/1989 | Rupert ........................ 242/129 |
| 4,856,729 A | 8/1989 | Maraman .................... 242/129 |
| 4,861,134 A | 8/1989 | Alameel et al. ........... 350/96.2 |
| 4,886,336 A | 12/1989 | Deusser et al. ............ 350/96.2 |
| 4,913,365 A | 4/1990 | Shamass |
| 5,078,332 A | 1/1992 | Carter ........................ 242/129 |
| 5,193,758 A | 3/1993 | Laager et al. |
| 5,245,687 A | 9/1993 | Usui ........................... 385/134 |
| 5,668,909 A * | 9/1997 | Mozzati ...................... 385/134 |
| 5,703,990 A * | 12/1997 | Robertson et al. .......... 385/135 |
| 5,796,908 A * | 8/1998 | Vicory ........................ 385/135 |
| 5,915,061 A * | 6/1999 | Vanoli ........................ 385/135 |
| 6,076,755 A * | 6/2000 | Talamini, Sr. ............... 242/129 |

* cited by examiner

Primary Examiner—William A. Rivera

(57) ABSTRACT

A device for separating a first fiber portion from a second fiber portion of a fiber. The device includes a separator that can define at least one inner bearing surface adapted to restrain the first fiber portion from straightening when coiled within the separator. The separator defines at least one outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

26 Claims, 6 Drawing Sheets

DEVICE FOR SEPARATING PORTIONS OF SPOOLED OPTICAL FIBERS

CROSS-REFERENCES TO RELATED APPLICATIONS

This invention relates to the following commonly-owned and, at the time of filing, co-pending applications and/or patents which are incorporated by reference: "Device for Moving a Spooled Stack of Optical Fibers", now U.S. Pat. No. 6,076,755, issued Jun. 20, 2000; "Device for Segregating Optical Fibers", Ser. No. 09/317,826, filed May 25, 1999, now abandoned; and "Device for Stoting Optical Fibers", Ser. No. 09/317,643, filed May 25, 1999, now pending.

FIELD OF THE INVENTION

The present invention relates to the field of optical fiber storage systems and, more particularly, to a device for separating portions of spooled optical fibers.

BACKGROUND OF THE INVENTION

In a submarine optical transmission system, optical signals transmitted through the submarine optical fiber cable become attenuated over the length of the cable, which may stretch thousands of miles. To compensate for this signal attenuation, optical repeaters are strategically positioned along the length of the cable.

FIG. 1 illustrates a perspective view of a typical submarine optical repeater 10 having a cylindrical housing 12. A first submarine optical cable 16 enters repeater 10 at first end cover 14 and connects to first internal optical cable 18, which, in turn, connects to an optical repeater assembly 20. Optical repeater assembly 20 typically includes at least the following items (not shown in FIG. 1): optical components, connecting optical fibers, electronic circuits, and connecting wiring. Optical repeater assembly 20 connects via a second internal optical cable 19 to a second submarine optical cable 17, which exits repeater 10 at second end cover 15.

Typically, the optical fibers found within optical repeaters are circular in cross-section, and are constructed of glass surrounded by a protective jacket that is thicker than the glass. For example, a typical glass fiber ("glass fiber", "bare fiber", or "unjacketed fiber") can have an outer diameter of approximately 0.010 inches, and a typical jacketed fiber can have an outer diameter of approximately 0.040 to 0.060 inches.

The glass fiber is fragile. Because even microscopic damage to the glass fiber can adversely affect the reliability of the optical repeater (and, as a result, the reliability of the entire submarine optical fiber cable system), great efforts are normally taken to protect the glass fiber from damage. Generally, the likelihood of damage to the glass fiber can be reduced by ensuring that any curvature in the glass fiber meets or exceeds the minimum bending radius of the glass fiber. However, the minimum bending radius of the glass fiber is a function of the expected life of the glass fiber. For example, when at least a 25-year life is expected, the glass fiber typically has a minimum bending radius of approximately 1 inch. This is referred to as the reliability-adjusted minimum bending radius of the glass fiber, because meeting or exceeding this value provides acceptable reliability from bending damage during the expected life of the glass fiber.

Typically, the optical components found within optical repeaters are manufactured with a segment of optical fiber attached at each end and cut to a specified length. Each fiber segment contains a jacketed portion of specified length located adjacent to the optical component, and a bare portion of specified length extending from the opposite end of the jacketed portion. The bare portion is spliced into the bare portion of another segment in the repeater's optical circuit. Creating these splices can be a complicated task, requiring substantial lengths of bare fiber on each side of the splice. Optimally however, the repeater is designed to be as space-efficient as possible, thereby minimizing its production, storage, shipping, and installation costs. Thus, it is desirable to store each optical fiber segment in the most space-efficient manner possible.

FIG. 2 illustrates a perspective view of a known fiber storage device that can be located within, for example, a submarine optical repeater or branching unit. Tray 42 includes generally circular portal spool 44 which is surrounded by generally square portal well 48. The square portal well includes a fiber portal 68. Tray 42 also includes generally circular storage spool 46 which is surrounded by generally square storage well 50. Optical device 54 is mounted to tray 42 in optical cavity 52 which is connected to storage well 50 by cavity-to-storage channel 58 and by storage-to-cavity channel 64. Optical cavity 52 is connected to portal well 58 by portal-to-cavity channel 72 and cavity-to-portal channel 66.

Optical device 54 is connected to jacketed storage fiber 56 at the end of optical device 54 nearest storage well 50. Just inside storage well 50, jacketed storage fiber 56 connects to bare storage fiber 59. The end of bare storage fiber 59 is spliced to the end of bare connecting fiber 60 at splice 74. Bare connecting fiber 60 extends from splice 74 to jacketed connecting fiber 62 which, in turn, extends through storage-to-cavity channel 64, through optical cavity 52, through device-to-portal cavity 66, and into portal well 48. Within portal well 48, jacketed connecting fiber 62 wraps around portal spool 44 and exits at portal 68.

Jacketed connecting fiber 70 exits from the opposite end of optical device 54 and extends through portal-to-cavity channel 72, and into portal well 48, where it wraps around portal spool 44 and exits at portal 68. Spools 44 and 46 are designed with a radius greater than or equal to the reliability-adjusted minimum bending radius of the bare portion of fibers 56 and 60.

Although not shown, tray 42 can define more than one optical cavity and accompanying channels. In that situation, each additional optical fiber of any additionally mounted optical devices is routed and stored similarly to fibers 56, 59, 60, 62, and 70, i.e., in the channels connected to their respective optical cavity and around their respective spools. When more than one fiber is to be spooled around either spool 44 or 46, each additional fiber is wrapped around the spool generally above the preceding fibers, thereby forming a stack of spooled fibers.

Absent a late-stage design modification, jacketed fibers are generally not allowed to substantially intrude into the well where bare fiber is spooled, because such an intrusion can cause a jacketed fiber to press against or be spooled with a bare fiber. This is disadvantageous because the diameter of the jacketed fiber is much smaller than the reliability-adjusted minimum bending radius of the bare fiber. Thus, if the bare fiber is bent against the jacketed fiber, a violation of the minimum bending radius of the bare fiber can result, potentially causing unacceptable mechanical stresses in the bare fiber. Such a situation is particularly likely when a number of spooled bare fibers arc stacked on a spool, and each fiber must be pushed down into the well to make room for the successive fibers, the pushing action thereby greatly increasing the forces bending the bare fiber around the intruding jacketed fiber.

When intrusion is unavoidable, the jacketed portion may only extend into the well when the well has sufficient space to prevent the intruding jacketed portion from contacting the spooled bare portion. This means that the jacketed portion may typically intrude into the well by no more than about 1 inch. If the jacketed portion will intrude by more than about 1 inch, the tray design, or more typically the optical component design, should be modified to avoid damage to the bare fibers. However, when design changes substantially affect fiber portion lengths, other difficulties can ensue.

Changes in the length of the bare fiber portion can sometimes be accommodated by adjusting the amount of bare fiber wound around the spool, or adjusting how tightly the bare fiber is wound around the spool. However, an increase of more than 1 inch in the length of the jacketed fiber portion typically requires a chance to the optical component's manufacturing specification, because, as discussed previously, such an increase could cause the jacketed fiber to intrude excessively into the bare fiber storage area. Likewise, a decrease in the jacketed fiber's length could cause the bare fiber to be stored, unprotected, in a fiber channel, where it could be scratched by contact with the channel, or could be bent against an edge of the channel or another jacketed fiber.

As previously discussed, these types of situations could expose the bare fiber, and potentially the entire submarine optical fiber cable system, to unacceptable damage. Thus, changes in the length of the jacketed fiber portion often require a change to the optical component's manufacturing specification. Such specification changes are typically very costly, particularly if initiated after the manufacturer has begun producing the optical component.

Thus, there is a need for a device that allows jacketed fiber and bare fiber to be stored in a protective, space-efficient, and separate manner, and that accommodates substantial changes to the length of jacketed fiber after the storage tray has been designed, and particularly after optical components have been specified and ordered.

SUMMARY OF THE INVENTION

Embodiments of the present invention provide a device for separating a first fiber portion from a second fiber portion of a fiber. The device can include a separator that can define at least one inner bearing surface adapted to restrain the first fiber portion from straightening when coiled within the separator. The separator can also define at least one outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

BRIEF DESCRIPTION OF THE DRAWINGS

The invention will be more readily understood through the following detailed description, with reference to the accompanying drawings, in which.

DETAILED DESCRIPTION

Embodiments of the present invention provide a device for separating a first fiber portion from a second fiber portion of a fiber. The device can include a separator that can define at least one inner bearing surface adapted to restrain the first fiber portion from straightening when coiled within the separator. The separator can also define at least One outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

As used herein, the term "fiber" can include any type of fiber in any system or component, provided that the fiber has at least a first fiber portion connected to a second fiber portion. For example, the fiber can be an optical fiber that has a jacketed portion connected to a barc portion.

As used herein, the term "separator" can include any device or combination of devices that serve to separate a first fiber portion from a second fiber portion of a fiber.

As used herein, the term "bearing surface" can include one or more points, lines, or areas, or combination thereof, upon which a fiber, or one or more portions of a fiber, can bear.

As used herein, the term "separator opening" can include any aperture in the separator through which the fiber can pass approximately where it transitions from the first fiber portion to the second fiber portion.

As used herein, the term "path" can include the route of a fiber, the location of a portion of a fiber, or the location of an entire fiber.

As used herein, the term "longitudinal tension" refers to tensile forces applied to a fiber, in a direction parallel to the length of the fiber.

As used herein, the term "reliability-adjusted minimum bending radius" refers to that radius value, below which, the portion of the fiber bent thereto has a significantly increased likelihood of experiencing substantial degradation of structural or optical properties during the predetermined design life of the fiber.

Embodiments of the present invention can be used for separating coiled connected portions of an optical fiber within a submarine optical repeater or branching unit. A top view of such an embodiment is shown in FIG. 3.

Figure 1:
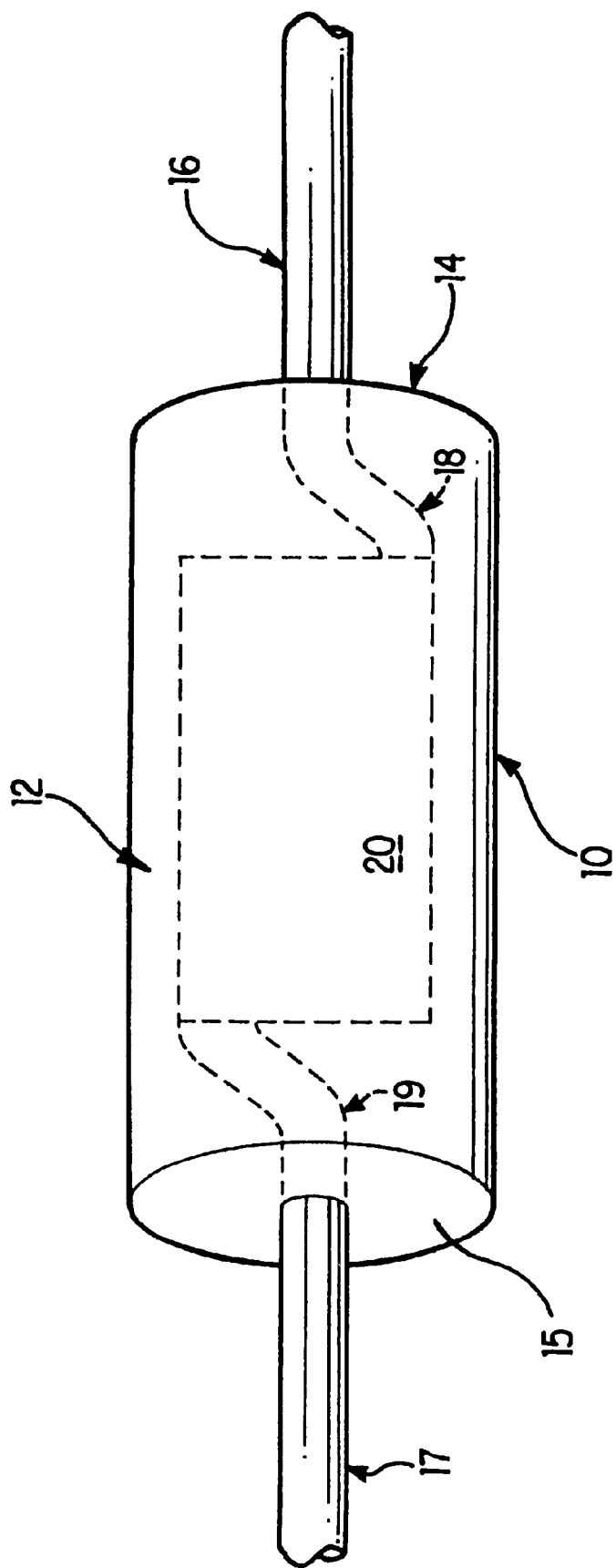
FIG. 1 is a perspective view of a known submarine optical repeater.
Figure 2:
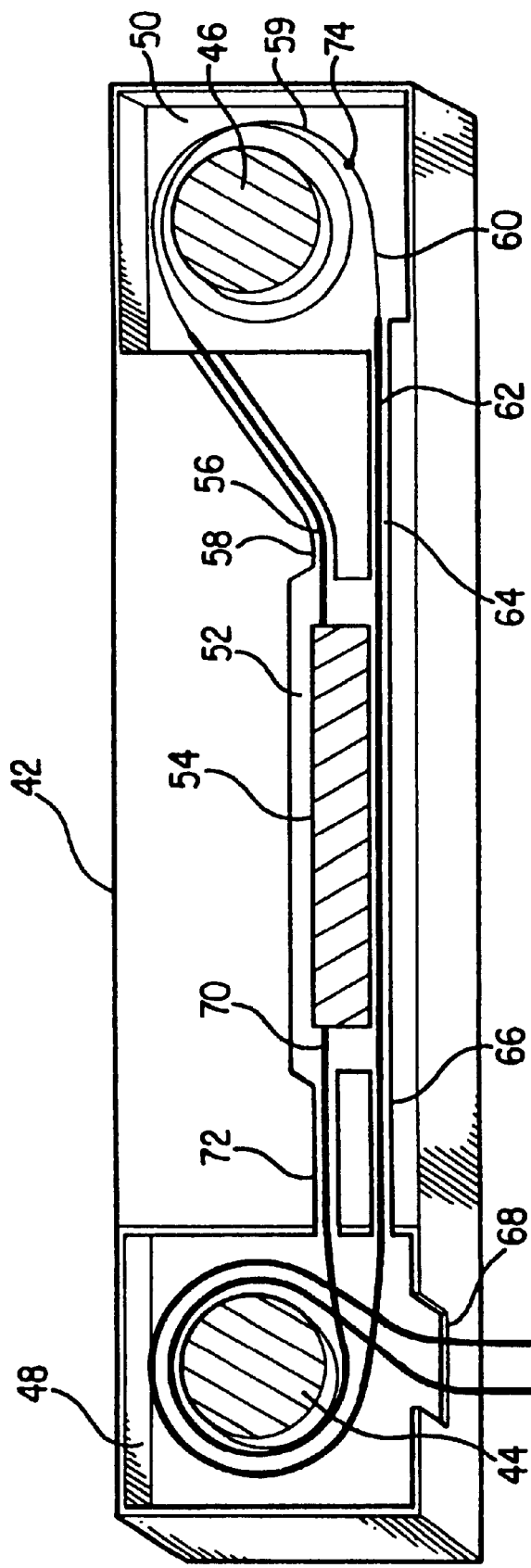
FIG. 2 is a perspective view of a known fiber storage device.
Figure 3:
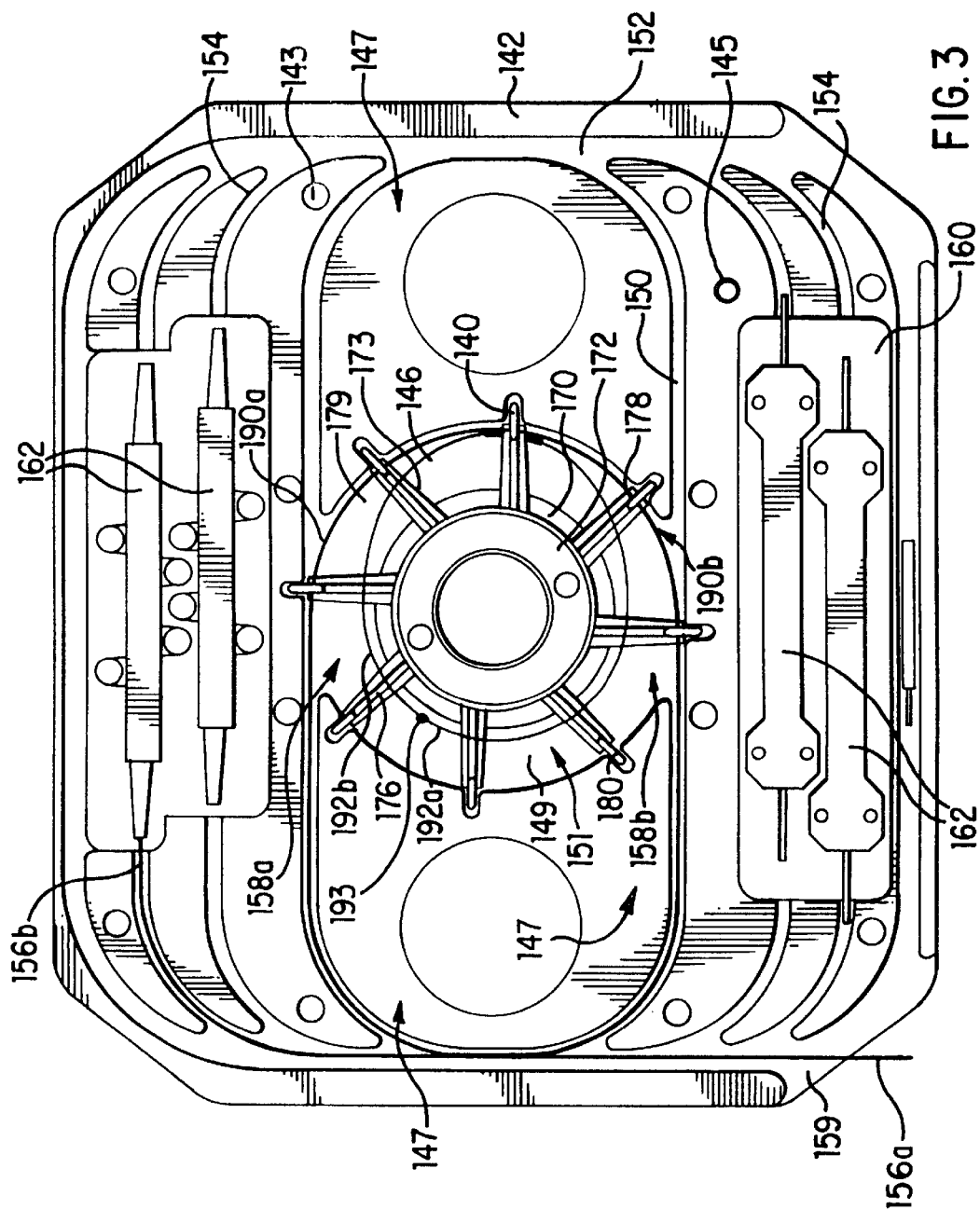
FIG. 3 is a top view of an embodiment of the invention in conjunction with a fiber storage tray.

Referring to FIG. 3, separator assembly 140 can work in conjunction with a fiber storage tray 142, which can define an elongated generally circular fiber storage well 146. Tray 142 also can define several types of channels, including well channels 150, portal channels 152, and device channels 154. Well channels 150 can provide for routing fibers 156*a* and 156*b* through well openings 158*a* and 158*b*, respectively, and into fiber storage well 146. Portal channels 152 can terminate at portals 159, which breach the outer edge of tray 142. Portal channels 152 can also connect to well channels 150. Device channels 154 can connect portal channels 152 to device cavities 160.

Device cavities 160 can provide a space for mounting optical devices 162 such that the top of each optical device 162 can be at or below the height of top surface 147 of tray 142. This can allow a flat tray cover (not shown) having an alignment pin (not shown) to be aligned with alignment hole 145 and attached over tray 142 by screws (not shown) connected to tray 142 at cover holes 143.

Tray 142 can contain two device cavities 160 that can each hold two optical devices 162. Although not shown, each optical device can have an optical fiber extending from each longitudinal end. As shown, one of the optical devices 162 can have optical fiber 156*b* extending from one of its longitudinal ends. The routing of fiber 156*b* will be described below. In an alternative embodiment, tray 142 can be designed to not have optical devices 162 mounted therein. In such an embodiment, tray 142 can also be designed to not include device cavities 160 or device channels 154.

Elongated generally annular spool 170 can be formed as an integral part of tray 142 within the circumference of fiber storage well 146. Alternatively, elongated generally annular spool 170 can be formed separate from and connected to tray 142. Spool 170 and tray 142 can be constructed of, for example, aluminum. Alternatively, spool 170 and tray 142 can be constructed of any material, including, but not limited to, metals, metallic alloys, plastics, rubbers, ceramics, woods, or composite materials. The outer radius of spool 170 can meet or exceed the reliability-adjusted minimum bending radius of bare fibers 192*a* and 192*b*.

The circumference of fiber storage well 146 can generally concentrically substantially surround spool 170. The placement of spool 170 within well 146 can define an elongated annular fiber storage space 149 and an annular fiber-supporting surface 151. Spool 170 can generally concentrically substantially surround elongated generally annular hub 172. A plurality of elongated generally cylindrical connector arms 176 can be connected to hub 172, and can extend generally radially from hub 172 through one-to-one corresponding gaps 173 in spool 170.

Figure 4:
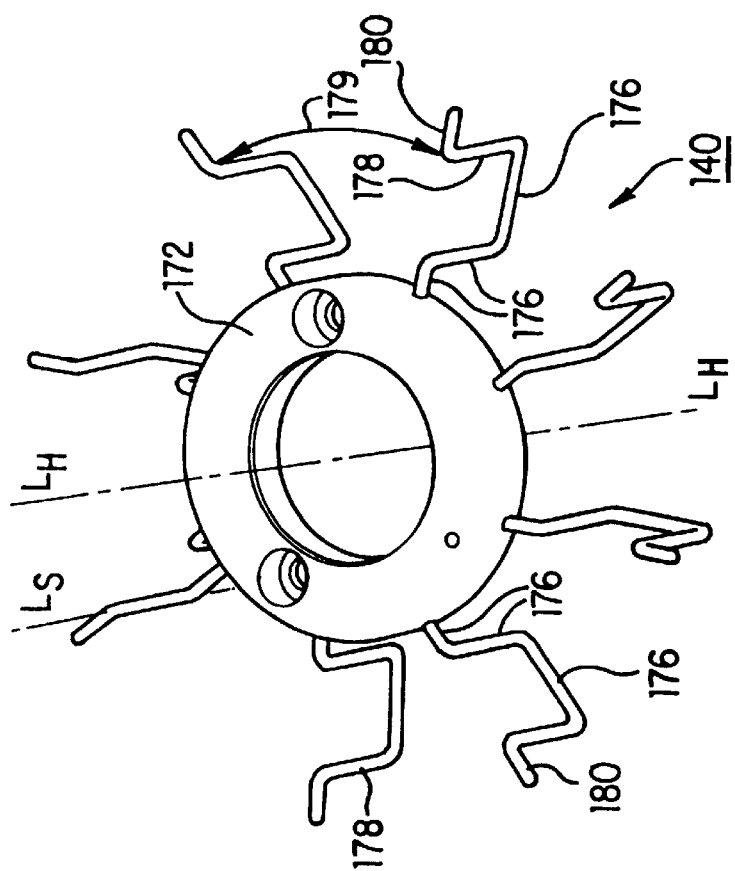
FIG. 4 is a perspective view of an embodiment of the invention.

FIG. 4 provides a perspective view of separator assembly 140. Referring to FIG. 4, attached to each of connector arms 176 can be an elongated generally cylindrical separator arm 178. The longitudinal axis ($L_s$) of each of separator arms 178 can be parallel to the longitudinal axis ($L_H$) of hub 172. Also, the plurality of separator arms 178 can be generally equally circumferentially distributed about $L_H$, thereby forming a generally annular pattern. Each separator arm 178 can be isolated from the other nearest separator arms by adjacent generally arcuate separator openings 179, each of which can be sufficiently wide to allow a jacketed fiber to pass therethrough.

Each of separator arms 178 can connect to an elongated generally cylindrical retaining arm 180. Thus, each connector arm 176 can be connected to a single corresponding separator arm 178, which can be connected to a single corresponding retaining arm 180.

The collection of separator arms 178 can define a separator, which can serve as an elongated annular device for coiling jacketed fibers thereon, for separating jacketed fibers from bare fibers, and for preventing spooled bare fibers from straightening when coiled within the separator. The collection of connector arms 176, separator arms 178, and retaining arms 180 can define a separator cage, which can generally resemble the radially extending spokes of a wheel when viewed from a point along $L_H$. The combination of hub 172 and the separator cage can form separator assembly 140, which can be constructed of stainless steel. Alternatively, separator assembly 140 or any of its components or sub-components can be constructed of any material, including, but not limited to, metals, metallic alloys, plastics, rubbers, ceramics, woods, or composite materials. Each arm of the separator cage can be created by forming a rod into a shape resembling the letter "U" having elongated serifs. This can be followed by attaching each of these bent rods to hub 172 using an epoxy.

Figure 5:
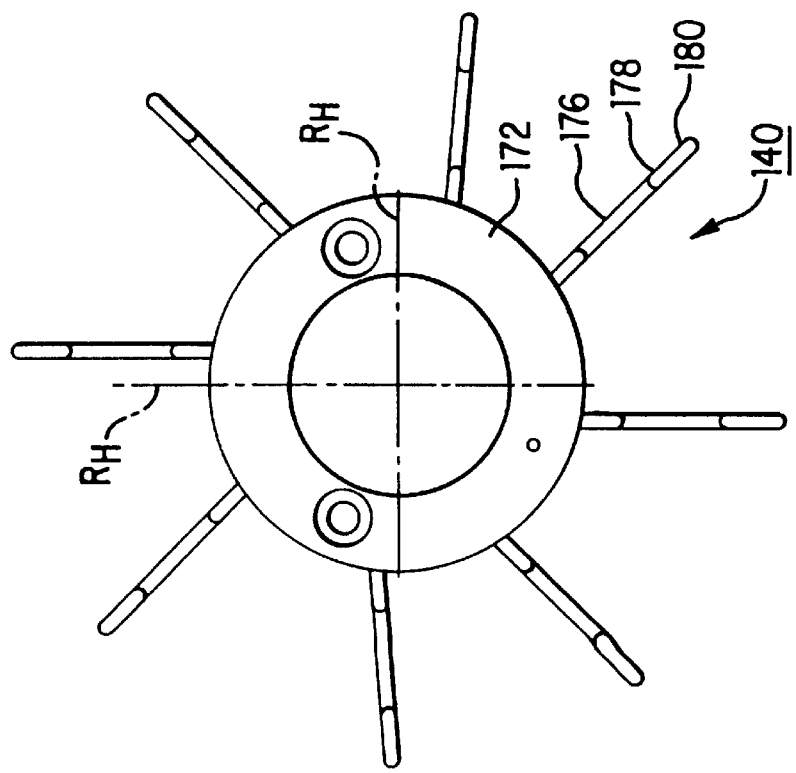
FIG. 5 is a top view of the embodiment shown in FIG. 4.

FIG. 5 provides a top view of separator assembly 140, from a point along $L_H$. Referring to FIG. 5, connector arms 176 can take a straight path from hub 172 to separator arms 178. However, the longitudinal axes of connector arms 176 can be parallel to, but not coincident with the radii ("$R_H$") of hub 172, being offset therefrom throughout the length of connector arms 176. Alternatively, the longitudinal axes of connector arms 176 can be coincident with $R_H$. In yet another alternative, the inner ends of connector arms 176 can fall along different radii than the outer ends of connector arms 176. In still another alternative, connector arms 176 can be curvilinear, rather than straight. Thus, connector arms 176 can take essentially any path to connect hub 172 to separator arms 178.

As shown, each of retaining arms 180 can take a straight path to connect their terminal end to their respective separator arm 178. The longitudinal axis of each retaining arm 180 can be parallel to the longitudinal axis of its corresponding connector arm 176. Because connector arms 176 can be parallel to, but not necessarily coincident with $R_H$, retaining arms 180 also need not be coincident with $R_H$, and can be offset therefrom throughout the length of retaining arms 176. However, like connector arms 176, in an alternative embodiment, retaining arms 180 can take any path to connect their terminal end to their respective separator arm 178.

Hub 172, and thus separator assembly 140, can be slidably moved along $L_H$. Typically, separator assembly 140 can be utilized in one of two positions along $L_H$. When away from tray 142, separator assembly 140 can be in the spooling/unspooling position shown in the cross-sectional view of FIG. 6. Otherwise, separator assembly 140 can be utilized in the storage position shown in the cross-sectional view of FIG. 7.

Figure 6:
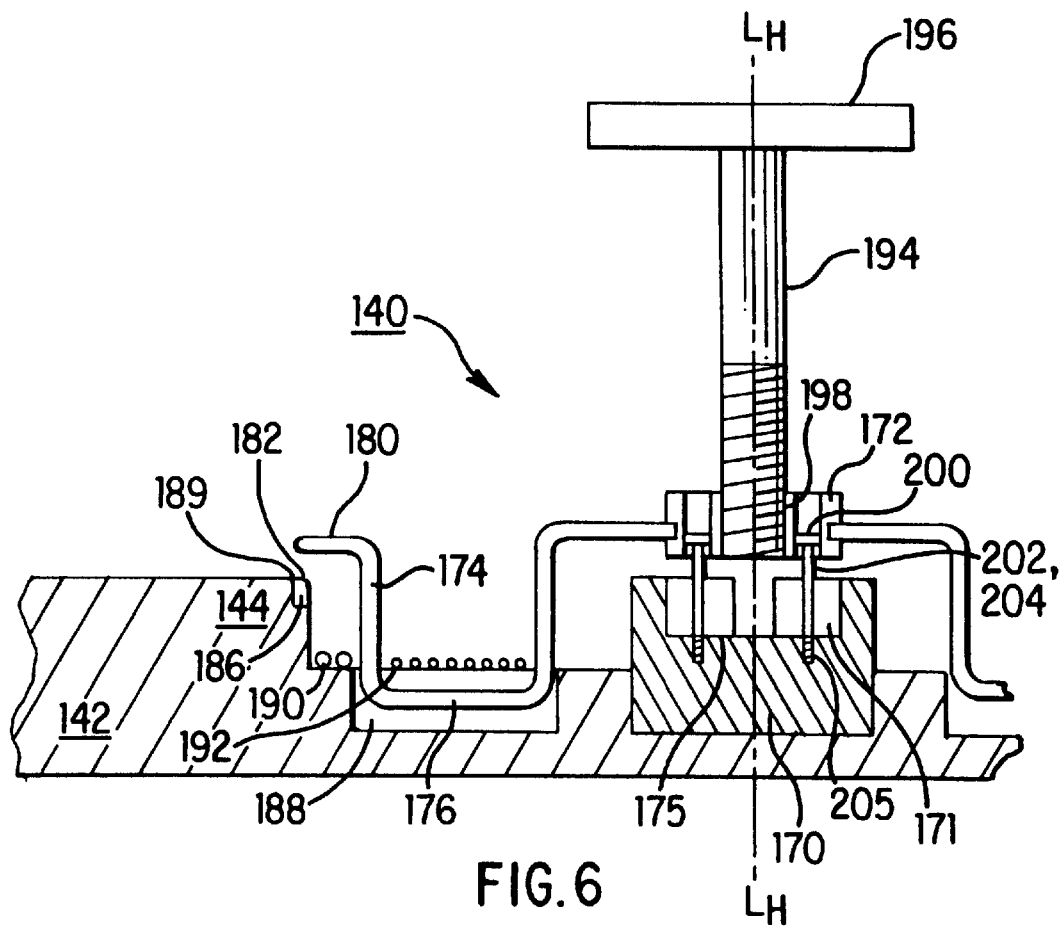
FIG. 6 is a cross-sectional view of the embodiment shown in FIG. 3 in the spooling/unspooling position.

Referring to FIG. 6, retaining arms 180 can overlap well edge 182 of tray 142 by an amount sufficient to prevent jacketed fiber 190 from uncoiling from about the separator. To accommodate retaining arms 180, well edge 182 can have a plurality of edge recesses 186 that can correspond in a one-to-one manner to, and can partially surround, retaining arms 180 to provide at least a slip fit. Tray 142 can include a plurality of connector arm recesses 188 that can correspond in a one-to-one manner to connector arms 176 and can prevent connector arms 176 from contacting bare fiber 192. Connector arm recesses 188 can extend through spool 170.

As shown in FIG. 6, hub 172 can be moved away from tray 142 along $L_H$, thereby moving retaining arms 180 away from well edge 182. This can allow a jacketed fiber portion 190 to be wrapped around or unwrapped from around the separator. To move hub 172, elongated generally annular pipe 194, which can have straight threads on at least one end its outer surface, and which can have optional grip handle 196, can be threaded into the correspondingly threaded inner circumference 198 of the upper portion of hub 172. Then, depending on its initial position, hub 172 can be pushed toward tray 142 or pulled away from tray 142.

However, hub 172 can be restrained from moving along $L_H$ away from tray 142 more than the distance needed to place separator assembly 140 in the spooling/unspooling position. This restraint can be provided mechanically by the bearing of hub 172 against the underside of the heads 200 of a plurality of restraining screws 202. The shafts 204 of these screws 202 can extend in an unthreaded manner through hub 172 and can thread into holes 205 in spool 170, thereby controlling the maximum distance that hub 172 can be moved away from spool 170, and thus tray 142. This maximum distance can be adjusted by adjusting the height of the heads 200 of screws 202 from spool 170.

Also shown in FIG. 6 is generally annular hub recess 171, which can be defined by spool 170, and within which hub 172 can releasably rest on generally circular hub seat 175 when in the storage position. Although not shown, an alignment pin can be attached to hub 172 parallel to the longitudinal axis of hub 172, and can align with a corresponding alignment hole in hub seat 175.

Figure 7:
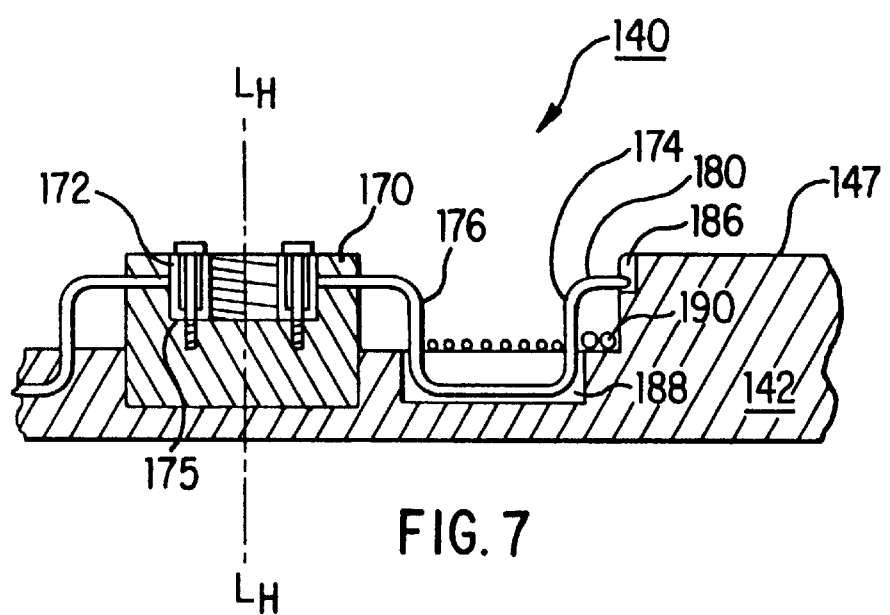
FIG. 7 is a cross-sectional view of the embodiment shown in FIG. 3 in the storage position.

Referring to FIG. 7, separator assembly 140 is shown in the storage position. In this position, because of the fitting of retaining arms 1 80 into retaining arm recesses 186, jacketed fiber 190 cannot be wrapped around or unwrapped from around the separator. Also, in this position, hub 172 can rest upon hub seat 175, and thus spool 170 and tray 142.

Top surface 147 of tray 142 can be higher than the top of separator assembly 140, and can thus allow a tray cover (not shown) to be attached to tray 142 without contacting separator assembly 140. Also, connector arm recesses 188 can be large enough to prevent connector arms 176 from contacting tray 142, and edge recesses 186 can be large enough to prevent retaining arms 180 from contacting tray 142.

Although not shown in FIG. 7, spool 170 can surround an elongated annular rod (not shown) having one end that can be supported by tray 142 and having an opposite end that extends slightly above hub seat 175 but below the top of spool 170. A circular disk (not shown), having a threaded outer circumference approximately matching the inner circumference 198 (not shown in FIG. 7) of hub 172, can be threaded into the inner diameter of hub 172 until the disk contacts the rod. Additional threading of the disk against the rod can cause hub 172 to rise off hub seat 175. Thus, the amount the disk is threaded into hub 175 can limit how close hub 172 can come to tray 142. This in turn can limit how close separator assembly 140, and particularly retaining arms 180 can come to tray 142. Therefore, the disk can be threaded downward to raise separator assembly 140 into the spooling/unspooling position of FIG. 6, or can be threaded upward to lower separator assembly 140 into the storage position of FIG. 7.

The operation of separator assembly 140 can be understood by reference to FIG. 3. It is assumed that separator assembly 140 is in the spooling position of FIG. 6. It is also assumed that a first fiber 156a, having a first jacketed portion 190a connected to a first bare portion 192a, has previously been spliced at splice 193 to a second bare portion 192b, which is connected to a second jacketed portion 190b of second fiber 156b. At first well opening 158a, first jacketed portion 190a can be routed into fiber storage well 146.

Assuming first fiber 156a and second fiber 156b will be wrapped clockwise, first jacketed portion 190a can be then slipped beneath that retaining arm 180 that is nearest to first well opening 158a when proceeding clockwise from first well opening 158a. First jacketed portion 190a can be then urged downwards between the separator arm 178 corresponding to that retaining arm and the wall of fiber storage well 146. Advancing clockwise, first jacketed portion 190a can continue to be slipped beneath each successive retaining arm 180, and can thereby become spooled behind the corresponding separator arm 178.

When first jacketed portion 190a cannot reach another separator arm 178, first jacketed portion 190a can be routed through the adjacent separator opening 179, such that no more than about 1 inch of jacketed portion 190 is located inside the circumference defined by separator arms 178. First bare portion 192a and second bare portion 192b can be then spooled clockwise around spool 170, leaving only about 1 inch of second bare portion 192b unspooled. Then, second jacketed portion 190b can be routed through the adjacent separator opening 179, such that less than about 1 inch of second jacketed portion 190b is located inside the circumference defined by separator arms 178. Similar to first jacketed portion 190a, second jacketed portion 190b can be spooled clockwise behind separator arms 178 and then can be routed out of fiber storage well 146 at second well opening 158b. At this point, either another fiber 156 can be spooled above the previously spooled fiber(s), or separator assembly 140 can be moved into the storage position of FIG. 7.

Thus, the described embodiment offers numerous advantages over the known fiber storage devices. For instance, the separator can allow a jacketed portion of at least one optical fiber to be spooled substantially separately from a bare portion of the fiber. The separator can be dimensioned to separate nearly any length of jacketed portion from nearly any length of bare portion. Moreover, even if the length of either portion changes, the separator can continue to separate the jacketed portion from the bare portion. Thus, the separator can prevent the jacketed portion from substantially intruding into the storage area of the bare portion, and can prevent the problems caused by changes in length of either portion.

The separator can also allow jacketed portions and bare portions to be stored in a very space-efficient manner. Moreover, the separator can allow the portions to be stored in a safer manner. For instance, the separator can allow both portions to be stored without violations of either portion's reliability-adjusted minimum bending radius. The separator can also allow the bare portions to avoid being stored within a fiber channel, where the bare fiber could be scratched by contact with a sharp corner.

By removing the requirement that jacketed portions be stored within fiber channels, the separator provides numerous additional design possibilities to the designer of the fiber storage assembly. For instance, the separator allows new shapes, dimensions, and patterns for the tray, restrainer, and fiber channels.

The separator can be adapted to be moved between a first position that allows the jacketed portion to be spooled, and a second position that prevents the jacketed portion from being unspooled. Also, the separator can be adapted to limit its movement to the first position and/or the second position.

There can be a number of alternative embodiments for the invention. For example, the separator can be formed as an elongated annulus. In this embodiment, the separator can be a unitary body. Alternatively, the separator can be formed of a plurality of bodies, a further example of which will be discussed below.

When formed as an elongated annulus, both the inner perimeter and the outer perimeter of the separator can be circular. Alternatively, the separator can be formed in any curvilinear or rectilinear shape, or in any combination thereof. Furthermore, either perimeter can be any curvilinear or rectilinear shape, or in any combination thereof. Thus, either the inner bearing surface or the outer bearing surface of the separator can be one or more points, lines, or areas, or any combination thereof.

When the separator is embodied as an elongated annulus, both the inner perimeter and the outer perimeter of the separator can be continuous, both circumferentially and longitudinally along the separator. Moreover, in this embodiment, the separator's inner and outer perimeter can be uniform in their separation from each other at all points along each perimeter, and at all points along the length of the separator.

However, in one alternative embodiment, the inner and/or outer diameter of the annulus can vary along its length. In another alternative embodiment, the annulus can have one or more openings in its annular wall, and any of these openings can extend for any portion of the length of the separator. Thus, the separation between the separator's inner and outer perimeters can vary between positive values and zero.

In another alternative embodiment, the separator can be a plurality of bodies. For example, the separator can be a plurality of parallel rods arranged to form the vertices of a regular polygon. In this embodiment, the rods can collectively define an inner perimeter and an outer perimeter, each in the shape of regular polygons, yet the separator itself is not a single body. The rods can be any shape, including straight, segmented, and curved. The rods can be arranged parallel to each other or not parallel. The rods can be arranged such that either the inner perimeter and/or the outer perimeter defined thereby can form a regular polygon, or an irregular polygon, or any rectilinear shape, or any curvilinear shape, or any shape that is both rectilinear and curvilinear. Moreover, either perimeter can be continuous or discontinuous. Thus, either the inner bearing surface or the outer bearing surface of the separator can be one or more points, lines, or areas, or any combination thereof. Again, the separation between the inner perimeter and the outer perimeter, either along those perimeters, or along the length of the separator, can vary between positive values and zero.

As an additional alternative embodiment, the separator can be portable. This can be advantageous when there is a need to insert an optical component into an existing optical circuit, such as can be the case when the circuit design must be modified after initial design or assembly. The new optical component can be mounted somewhere near the insertion location, and the component's separator can be movably mounted nearby, thereby providing convenient and space-efficient separation for the bare and jacketed portions of the component's fibers.

To facilitate its operation, the separator can be supported by, or movably mounted to, a base. The base can include any device or combination of devices that define a surface. For example, the base can be a generally planar surface. Alternatively, the base can be a surface having concave portions, or convex portions, or stepped portions, or various irregularities. Alternatively, the separator can be an integral part of the base.

In some alternative embodiments, the separator can prevent the fiber portion coiled within the separator from coiling so tightly that the reliability-adjusted minimum bending radius of the fiber is violated. Alternatively, the separator can be used in combination with a spool, or can include an integral spool to accomplish this task. As used herein, the term "spool" can include any device or combination of devices defining at least one outer bearing surface about which a portion of the fiber coiled within the separator can be spooled such that any curvature formed in the fiber can at least meet the fiber's reliability-adjusted minimum bending radius. Thus, there can be a number of alternative embodiments for the spool. For example, like the separator, the outer perimeter defined by the spool can be continuous, or can have interruptions. In addition, the outer perimeter defined by the spool can be circular or polygonal. Moreover, the spool can be a single device, such as an annulus, or can be a plurality of devices, such as arms or fingers. Furthermore, the spool can be adapted to extend perpendicular to the tray or to extend merely generally away from the tray. Thus, the outer bearing surface of the spool can be one or more points, lines, or areas, or any combination thereof.

In some alternative embodiments, the separator can prevent the fiber portion coiled about the separator from straightening. However, the separator can be used in combination with, or can include an integral restrainer to accomplish this task. As used herein, the term "restrainer" can include any device or combination of devices that prevent the fiber coiled about the separator from straightening. The restrainer can define an inner bearing surface, similar to that of the separator. The inner bearing surface of the restrainer can be one or more points, lines, or areas, or any combination thereof.

In one embodiment, the restrainer can be a well defined within the tray. Such a well can be any shape, including circular. Alternatively, the restrainer can be an annulus attached to a base. In another alternative embodiment, the restrainer can comprise one or more arms or posts generally extending away from the base. In all these cases, the restrainer can prevent a fiber coiled about the separator from straightening by uncoiling.

The separator or the restrainer can include an apparatus to prevent a fiber coiled about the separator from straightening by sliding off either end of the separator. For example, as in FIG. 6, the separator can be movably attached to a tray at one end and can include retaining arms attached to its other end. In an alternative embodiment, the retaining arms can be attached to the separator arms, but can also bend back towards the tray so that they become approximately parallel to the separator arms, and can engage with holes in the tray to prevent a coiled fiber from straightening. In yet another alternative embodiment, a cap can attach to one or both ends of the separator, the cap having a larger perimeter than the outer perimeter defined by the separator. In still another alternative embodiment, retaining arms or a cap can attach to the restrainer. In another alternative embodiment, the retaining arms can be replaced by a generally flat annular band attached to the separator.

In yet another alternative embodiment, the restrainer can be one or more pieces of tape, string, or adhesive that secure the fiber to itself, the separator, a tray, or a base.

Figure 8:
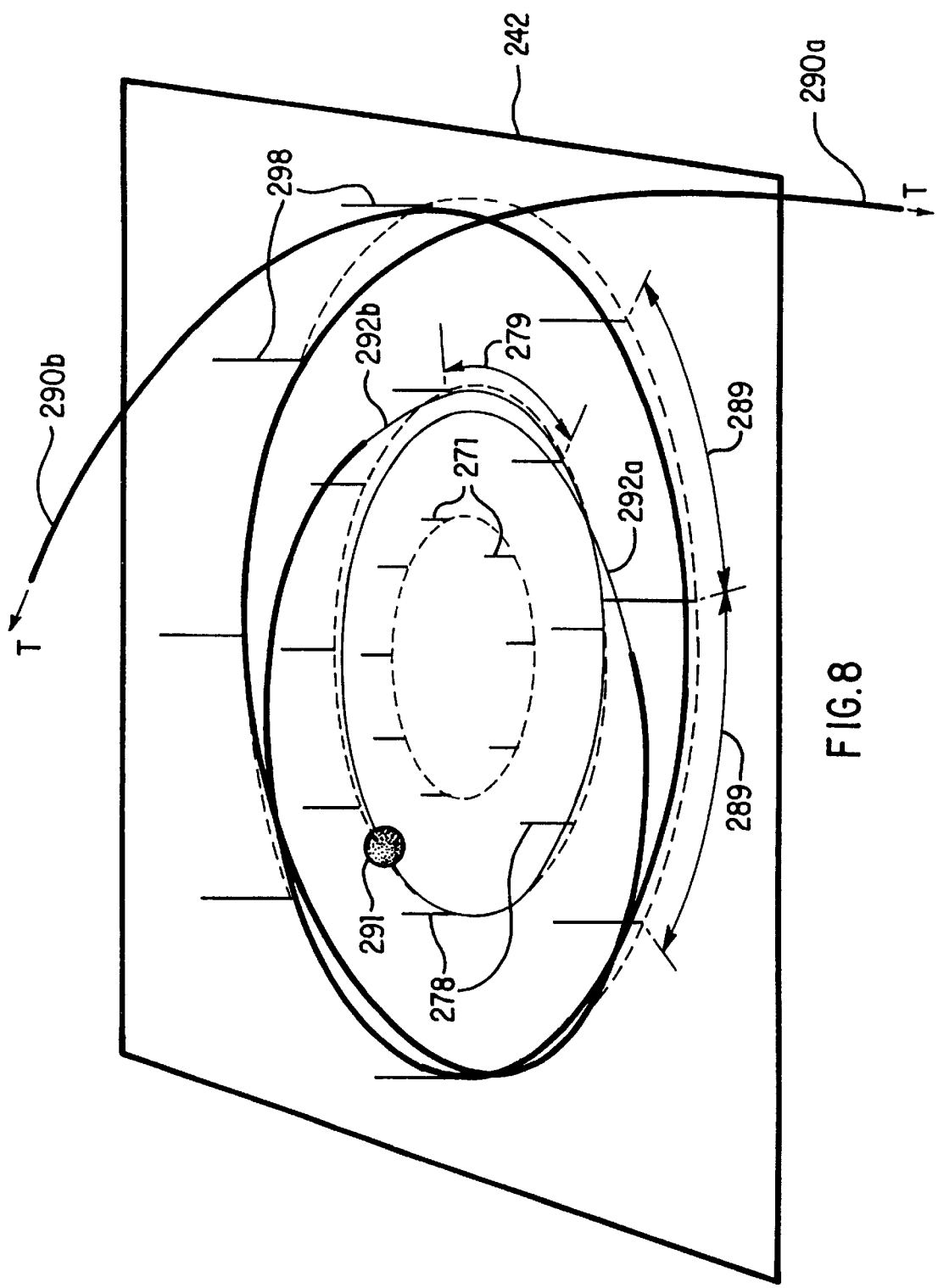
FIG. 8 is a perspective view of an alternative embodiment of the invention.

FIG. 8 provides a perspective view of one embodiment that includes several of the aforementioned alternatives. A separator can be defined by a plurality of cylindrical separator arms 278 that can be mounted on or extend through base 242. Likewise, a spool can be defined by a plurality of cylindrical spool arms 271 that can be mounted on or extend through base 242. Likewise, a restrainer can be defined by a plurality of cylindrical restrainer arms 298 that can be mounted on or extend through base 242.

Jacketed fibers 290a and 290b can be subject to variable longitudinal tension T. Jacketed fiber 290a can be attached to bare fiber 292a. Jacketed fiber 290b can be attached to bare fiber 292b. Bare fiber 292a can be attached to bare fiber 292b at splice 291. The combination of the attached fibers 290a, 290b, 292a, and 292b can define a fiber.

In operation, jacketed fibers 290a and 290b can be coiled within the restrainer and about the separator. Bare fibers 292a and 292b can be coiled within the separator and about the spool. Between separator arms 278 can be openings 279 that allow jacketed fibers 290a and 290b to enter and exit the separator. Between restrainer arms 298 can be openings 289 that allow jacketed fibers 290a and 290b to enter and exit the restrainer.

The separator can define at least one inner bearing surface that can restrain bare fibers 292a and 292b from uncoiling. The separator can also define at least one outer bearing surface that can limit the curvature of the path taken by jacketed fibers 290a and 290b such that the radius of every curve on that path can at least meet the reliability-adjusted minimum bending radius of jacketed fibers 290a and 290b. The location, extent, and number of these inner and outer bearing surfaces, as well as the jacketed fibers' path curvatures, can depend on the amount of longitudinal tension T in jacketed fibers 290a and 290b. The restrainer can define at least one inner restrainment bearing surface that can restrain jacketed fibers 290a and 290b from uncoiling. The location, extent, and number of these inner restrainment bearing surfaces can also depend on the amount of longitudinal tension T in jacketed fibers 290a and 290b.

The cylindrical arms of either the separator, or the spool, or the restrainer can include perpendicular retaining arms (not shown) that can prevent the respective portion of the fiber from uncoiling by sliding along the arms and away from base 242. If they extend through base 242, separator arms 278 can be connected to a hub or plate, thereby allowing separator arms 278 to be moved collectively in a direction parallel to their longitudinal axes, and thereby into either a spooling position or a storage position. Likewise, spool arms 271 or restrainer arms 298 can also be connected to one or more hubs or plates, thereby allowing either or both sets of arms to be moved collectively in a direction parallel to their longitudinal axes.

Thus, a device can be provided for separating a first fiber portion from a second fiber portion of a fiber. The device can include a separator that can define at least one inner bearing surface adapted to restrain the first fiber portion from straightening when coiled within the separator. The separator can also define at least one outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

Still other advantages and embodiments of the invention will become readily apparent to those skilled in this art from the above-recited detailed description. Accordingly, the drawings and descriptions are to be regarded as illustrative in nature, and not as restrictive. For example, although not shown, the separator can be constricted using six, rather than eight, separator arms, with a corresponding number of connector arms and restraining arms.

What is claimed is:

1. A device for separating a first fiber portion from a second fiber portion of a fiber, comprising:

an elongated separator having a longitudinal axis and defining at least one inner bearing surface adapted to restrain the first fiber portion from straightening when coiled within said separator;

said separator defining at least one outer bearing surface adapted to limit a path defined by the second fiber portion when coiled on said separator, the path varying with a longitudinal tension in the second fiber portion, the path having a plurality of curves each having a radius, the radius of each curve of the path at least meeting a reliability-adjusted minimum bending radius of the second fiber portion; and said separator defining at least one separator opening adapted for passing the fiber therethrough;

wherein said separator is movable along its longitudinal axis.

2. The device of claim 1, wherein said separator is generally annular.

3. The device of claim 1, wherein said separator includes a plurality of separator arms.

4. The device of claim 1, wherein said separator includes a plurality of separator arms distributed about said longitudinal axis.

5. The device of claim 1, wherein said separator includes a plurality of separator arms distributed concentrically about said longitudinal axis.

6. The device of claim 1, further comprising a generally annular retainer connected to and surrounding said separator.

7. The device of claim 1, further comprising a generally annular retainer connected to and surrounding said separator, wherein said retainer defines at least one retainer opening that corresponds with said at least one separator opening.

8. The device of claim 1, wherein said separator is adapted to be bounded by a restrainer.

9. The device of claim 1, further comprising a restrainer and a generally annular retainer connected to and surrounding said separator, wherein said separator is adapted to be bounded by said restrainer, and said retainer generally overlaps said restrainer.

10. The device of claim 1, further comprising a generally annular retainer connected to and surrounding said separator, wherein said retainer is adapted to be releasably received in a retainer recess defined in a base.

11. The device of claim 1, further comprising a restrainer and a generally annular retainer connected to and surrounding said separator, wherein said retainer is adapted to be releasably received in a retainer recess defined within said restrainer.

12. The device of claim 1, further comprising a restrainer and a generally annular retainer connected to and surrounding said separator, wherein said retainer defines at least one retainer opening that corresponds with said at least one separator opening, wherein said retainer is receivable in a retainer recess defined in said restrainer, and wherein said retainer recess is interrupted by at least one ridge that corresponds with said at least one retainer opening.

13. The device of claim 1, further comprising a hub connected to said separator.

14. The device of claim 1, further comprising a hub connected to said separator by at least one hub connector.

15. The device of claim 1, further comprising a spool and a hub connected to said separator, said hub defining an outer hub perimeter that is smaller than an outer spool perimeter defined by said spool.

16. The device of claim 1, further comprising a spool and an elongated generally annular hub connected to said separator by a plurality of connector arms, wherein said spool slidably and concentrically surrounds said hub.

17. The device of claim 1, further comprising a hub connected to said separator by a plurality of connector arms, wherein said separator includes a plurality of separator arms.

18. The device of claim 1, further comprising a hub connected to said separator by a plurality of connector arms, wherein said separator includes a plurality of separator arms attached to said plurality of connector arms in a one-to-one correspondence.

19. The device of claim 1, further comprising a hub connected to said separator by a plurality of connector arms, said hub adapted to be slidably and concentrically surrounded by a spool attached to a base that includes a plurality of connector arm recesses that correspond in a one-to-one manner with said plurality of connector arms, wherein each of said connector arm recesses is adapted to surround its corresponding connector arm.

20. The device of claim 1, wherein said separator includes a plurality of separator arms, wherein said separator is surrounded by and connected to a plurality of retaining arms attached to said plurality of separator arms in a one-to-one correspondence.

21. The device of claim 1, further comprising a hub connected to said separator, wherein said separator is adapted to be moved perpendicular to a base supporting said separator, and said separator is adapted to be limited in its movement toward the base by said hub bearing upon the base.

22. The device of claim 1, further comprising a hub connected to said separator, wherein said separator is adapted to be moved perpendicular to a base supporting said separator, and said separator is adapted to be limited in its movement away from the base by said hub bearing upon a plurality of headed screws extending through a one-to-one corresponding plurality of unthreaded holes in said hub and adjustably threading into a one-to-one corresponding plurality of threaded holes in the base, whereby, the distance of the screw heads from the base determines the movement distance of said separator from the base.

23. The device of claim 1, further comprising a handle adapted to releasably connect to said separator.

24. A method for separating a first fiber portion from a second fiber portion of a fiber, said method comprising:

coiling the first fiber portion within a separator defining at least one inner contact adapted to restrain the first fiber portion from straightening;

passing the fiber through a separator opening generally at a junction connecting the first fiber portion with the second fiber portion;

coiling the second fiber portion around the separator such that a radius of each curve defined by the second fiber portion at least meets a reliability-adjusted minimum bending radius of the second fiber portion; and moving the separator into a first position that allows coiling the second fiber portion around the separator.

25. The method of claim 24, further comprising the step of:

moving the separator into a second position that prevents uncoiling the second fiber portion from around the separator.

26. The method of claim 24, further comprising the step of:

preventing the movement of the separator.

* * * * *